United States Patent [19]

Romovacek

[11] 4,066,159
[45] * Jan. 3, 1978

[54] METHOD AND APPARATUS FOR THE CONTROL OF PITCH STILL OPERATION

[75] Inventor: George R. Romovacek, Monroeville, Pa.

[73] Assignee: Koppers Company, Inc., Pittsburgh, Pa.

[*] Notice: The portion of the term of this patent subsequent to Sept. 13, 1994, has been disclaimed.

[21] Appl. No.: 600,463

[22] Filed: July 30, 1975

Related U.S. Application Data

[63] Continuation of Ser. No. 383,152, July 27, 1973, abandoned.

[51] Int. Cl.² ............................................. B01D 3/42
[52] U.S. Cl. .................................... 196/132; 73/344; 203/2
[58] Field of Search ............... 196/132; 202/160, 206; 203/1-3, DIG. 18; 208/DIG. 1; 23/253 A, 230; 73/425.4 R, 344, 15 R

[56] References Cited

U.S. PATENT DOCUMENTS

| 1,639,057 | 8/1927 | Peabody | 73/344 |
|---|---|---|---|
| 2,473,765 | 6/1949 | Platts | 73/15 |
| 2,711,750 | 6/1955 | Norcross | 23/253 A |
| 3,025,232 | 3/1962 | Jones | 208/DIG. 1 |
| 3,184,396 | 5/1962 | Armstrong | 202/160 X |
| 3,742,755 | 7/1973 | Smith | 73/15 |

*Primary Examiner*—Norman Yudkoff
*Attorney, Agent, or Firm*—Herbert J. Zeh, Jr.; Oscar B. Brumback

[57] ABSTRACT

A method for controlling pitch still operations is disclosed comprising measuring the temperature of a sample of pitch from the still at a preselected viscosity value, comparing the measured temperature with a predetermined temperature value, and adjusting the parameters of the still operation in response to the comparison. An apparatus for carrying out the method is also disclosed comprising a means for withdrawing and returning a sample of pitch from the reactor, a chamber for holding the sample of pitch, the chamber having a means for heating and cooling the sample, a temperature sensing device and a viscosity measuring device located in the chamber, and a means for recording the temperature value when the viscosity has reached a predetermined value. Optionally and preferably, the apparatus has a means for comparing the temperature value measured when the viscosity has reached the preselected value with the predetermined temperature value and adjusting the parameters of the pitch production in response thereto.

4 Claims, 6 Drawing Figures

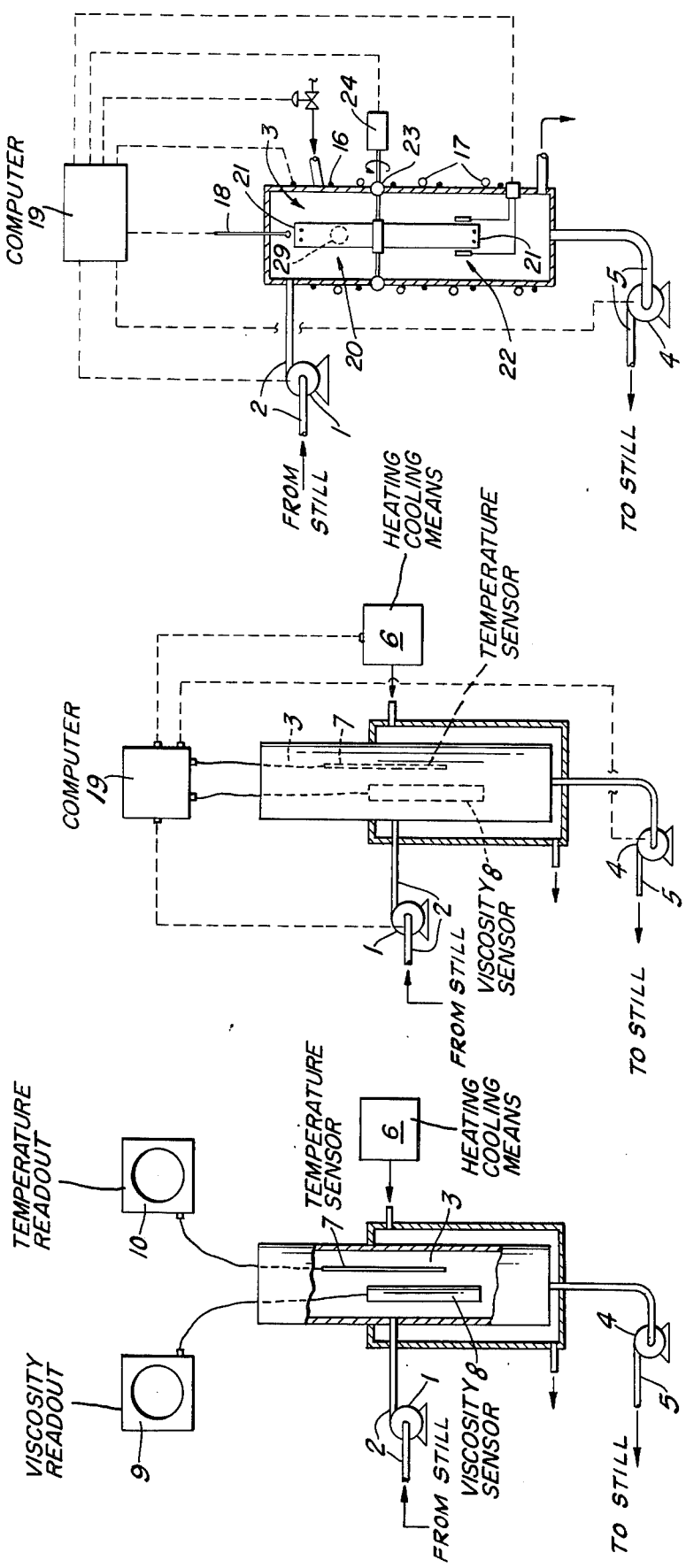

a compilation of data obtained for a series of various coal tar pitches. The correlation illustrated by the graph of FIG. 1 can be described by the equation $y = 0.76 +$

METHOD AND APPARATUS FOR THE CONTROL OF PITCH STILL OPERATION

This is a continuation of application Ser. No. 383,152, filed July 27, 1973, now abandoned.

BACKGROUND OF THE INVENTION

This disclosure is directed to a method and apparatus for controlling the production of pitch. More particularly, the invention is directed to a method and apparatus for automatically controlling the production of pitch by measuring the temperature of the pitch at a preselected viscosity value, comparing this measured temperature value with a predetermined temperature value, and adjusting the parameters of the pitch process in response thereto.

Coal tar pitches (solid or semisolid residues remaining from the distillation of coal tars) and petroleum based pitches have found wide use in various industries. They have been used for many years as waterproofing agents and protecting coatings. Some examples of these uses include built-up roofings, foundation wall coatings, pipeline enamels, and many others. The pitches are usually applied in these uses as a hot melt. Some other important uses of pitches are as binders for paving materials, binders for electrodes for the aluminum and steel industries and as binders for a variety of other carbon products.

Each pitch has well defined characteristics and properties dictated generally by the end use which they are designed to serve. Normal coal tar pitches usually have softening points of at least about 40° C and they may be as high as 135° C or higher.

The pitches of different softening points are generally prepared by subjecting the crude tar pitches to a heat treatment or to a heat treatment in combination with various chemical reactants such as oxygen or air. The most common method of preparing pitches of different softening points is distillation.

Heretofore, the production of pitches having different softening points was controlled by a totally manual process. After selection of a suitable tar source and distillation conditions (temperature and pressure) continuous or batch pitch still operations are controlled by the softening point of the pitch product. In general, a customer specifies a certain softening point (by the ring and ball, or similar method) with a latitude of plus or minus 2° to 3° C. The still operator adjusts the controls according to the desired softening point of the product. This involves taking a sample from the still, preparing it for the softening point determination, carrying out the latter, comparing the softening point to the desired softening point, and adjusting the controls according to the comparison value. It takes from about 30 minutes to one hour to take the softening point, make the comparison and adjust the controls. After adjustments, it takes at least another half hour or so before the reaction mixture comes to equilibrium and another sample can be taken. Because of the inherent difficulties with the prior art method, there has been a desire in the industry for a better method and apparatus for controlling pitch still operations.

SUMMARY OF THE INVENTION

I have discovered a new method for controlling pitch still operations by first measuring the temperature of a sample of the pitch when the viscosity of the pitch is at a preselected value, then comparing the measured temperature with a predetermined temperature value, and finally adjusting the parameters of the still operation in response to the comparison.

I have also discovered an apparatus for carrying out my method. The apparatus comprises a means for withdrawing a sample of pitch from the still and subsequently returning it thereto, a sample chamber for holding the withdrawn sample of pitch, said sample chamber having a means for heating and cooling the sample, a temperature sensing device and a viscosity measuring device located in the chamber, a means for recording the measured temperature at the point when the viscosity reaches the preselected value. Alternatively and preferably, the apparatus has a means for comparing the measured temperature value taken when the viscosity has reached the preselected value with a predetermined temperature value and adjusting the parameters of pitch production in response to the comparison.

The method and apparatus of my invention smooth out the still operation and provide a more uniform product. In addition, it eliminates the serial laboratory testing of softening points which is often a source of erroneous results because of the operational variables and subjective judgment associated with the sample preparation and softening point determination. The method and apparatus of my invention is more accurate and easier to use than the methods heretofore employed.

The apparatus and method of my invention are based on the fact that the viscosity of all pitches is approximately equal at the softening point (about 8,000 poises for the ring and ball softening point, somewhat lower for the cube-in-air softening point.) By installing a viscosity measuring device and temperature measuring device in a sample stream from the pitch production reaction, I can simultaneously measure the viscosity and temperature. A preselected viscosity of the sample is obtained by adjusting the temperature. The variable is the temperature. Its value at the preselected viscosity value is the equiviscous temperature. The equiviscous temperature can be recorded and used for controlling the still operation. It is directly proportional to the softening point determined by conventional methods. The equiviscous temperature provides a means for the continuous measurement of instantaneous softening point values.

FIG. 4 is an illustration of an apparatus of the present invention for measuring the equiviscous temperature.

FIG. 5 is an illustration of an apparatus of the present invention for measuring the equiviscous temperature and comparing it to a predetermined temperature; and FIG. 6 is an illustration of an apparatus of the present invention for measuring the equiviscous temperature and comparing it to a predetermined temperature.

FIG. 1 is a graph illustrating the linear correlation between the equiviscous temperature and softening points (determined by cube-in-air method.) The graph is 0.4 where y is the cube-in-air softening point and x is the measured equiviscous temperature.

Figure 1:
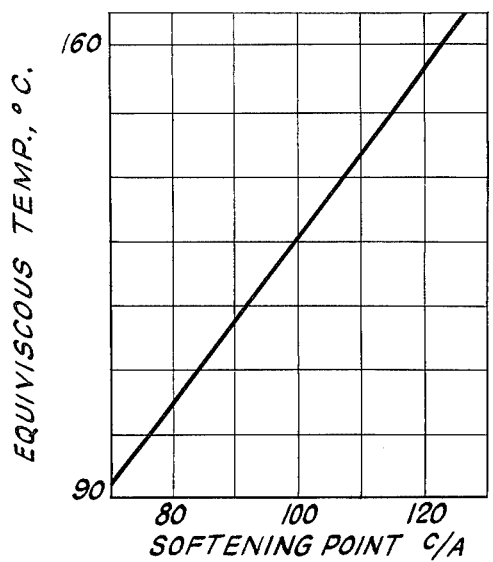
FIG. 1 is a graph illustrating the linear correlation between the equiviscous temperature and softening points.

The data for the graph in FIG. 1 was obtained in the following manner. Samples of various pitches were heated in a container provided with an external electric heater. The disc of spindle No. 6 of a rotational Brookfield viscometer was inserted into the center of the pitch sample directly above the mercury bulb of a thermometer. When the temperature of the molten pitch reached 180° C., the heater was switched off and the sample cooled down. The rate of cooling was about 5–6 C/min. The equiviscous temperature was read when the viscosity of the pitch was at a certain arbitrarily chosen value. For this experiment a value of 40 on the scale of the viscometer was used. The cube-in-air softening point was carefully determined for each of the pitch samples. Then the cube-in-air softening points were plotted against the measured equiviscous temperature taken at the arbitrary viscosity value of 40. The results are illustrated in FIG. 1.

Another series of experiments were performed to demonstrate the linear correlation between equiviscous temperatures and softening points as determined by conventional methods. The different pitches used for this experiment are as follows:

| Sample No. | Pitch Type | Softening Point (cube-in-air) |
|---|---|---|
| 1 | Fibre Pitch | 70° C |
| 2 | Arvida Pitch | 97° C |
| 3 | Alcoa Pitch | 112° C |
| 4 | Australian Pitch | 119° C |
| 5 | Alcan Pitch | 128° C |

The experimental procedure used was as follows. The pitch was molten in a vessel made from steel tubing of 1 inch inner diameter and 5 inches long provided with external electric heating. The blade of a Bendix Vibrating Probe Viscometer Model 1800 was inserted into the pitch sample. The temperature was measured by two thermocouples located strategically within the vessel. After inserting the blade of the viscometer, the temperature of the pitch was brought to a value where the viscometer reading corresponded to 1000 cPxg/cc° (The Bendix Vibrating Probe Viscometer measures the viscosity and density. Since, in most cases, the density of the pitches do not vary with respect to viscosity variations, they can be consider considered to remain constant and the readings from the viscometer are, therefore, the function of viscosity only.) When the reading reached 1000 cPxg/cc, the heater was switched off and the sample allowed to cool. The viscosity of the pitch increased during the cooling period and the temperature was recorded at viscosity increments corresponding to 1000 cPxg/cc. The measurement was terminated when the reading of the viscosity reached the value of 13000 cPxg/cc. At this moment the external heater was switched on and the cycle repeated. Two measurements were taken for each sample and the average value used. In order to check the reproducibility, one sample was measured four times. The reproducibility in equiviscous temperatures corresponded to a maximum of ± 0.5° C. The plot of the viscosity x density against temperature is illustrated in FIG. 2.

It can be seen from FIG. 2, that the linear correlations have approximately identical slopes at values of viscosities below about 6000 cPxg/cc. At higher viscosities the slope abruptly changes and does not remain the same for different pitches (lower for pitches with high softening points and steeper for pitches with low softening points.) This change in slopes may be attributed to the change of the pitch from a Newtonian to a non Newtonian liquid as the pitch approaches the temperature of the softening point. It also demonstrates the uncertainty which arises when we try to predict the softening point of pitches from viscosities measured at temperatures which are less than about 40° C higher than the actual softening point.

Figure 3:
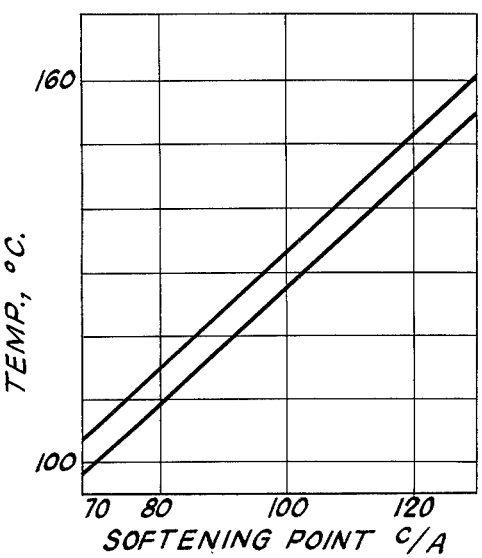
FIG. 3 is a graph illustrating the linear correlation between equiviscous temperature and the softening points.
Figure 2:
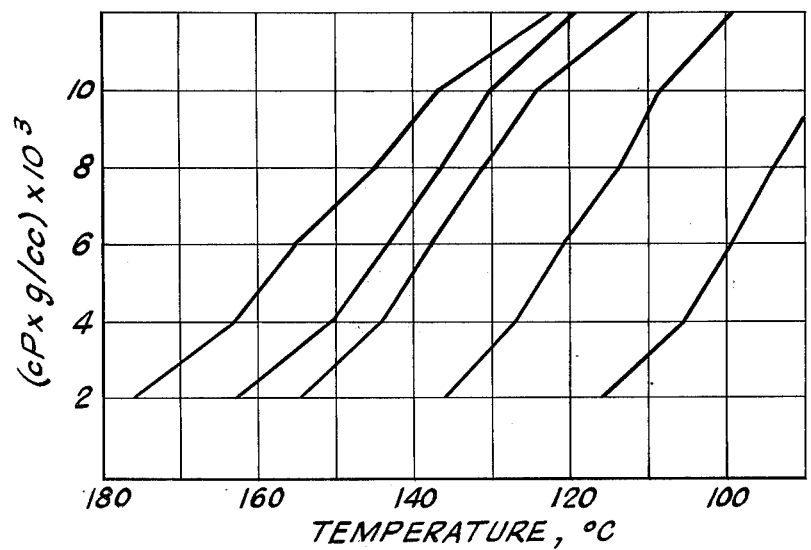
FIG. 2 is a graph illustrating the linear correlation of viscosity times density against temperature.

From the viscosity-temperature correlations of FIG. 2 the temperatures of equal viscosities (equiviscous temperatures) were read at 6000 cPxg/cc and 4000 cPxg/cc levels for all pitches measured and plotted against their softening points. The results are shown in FIG. 3 in which the upper line corresponds to 4000 cPxg/cc level. The linear correlation obtained are very satisfactory.

From the above information and the information given in FIGS. 1, 2 and 3 it can clearly be seen that there is a direct linear correlation between the equiviscous temperatures and the softening points as determined by conventional methods. This correlation can be used to accurately determine the conventional softening point value by measuring the equiviscous temperature. The equiviscous temperature is measured at a preselected viscosity value. This equiviscous temperature is then compared to a predetermined temperature value which is obtained from a plot of the conventional softening point values versus equiviscous temperatures taken at the preselected viscosity value. The operation of the still is adjusted in accordance with this comparison.

The method of my invention may be better understood by the following example using the data in FIG. 3. A suitable tar source is selected and charged to the still reactor and the distillation started. At some finite interval of time a sample of the pitch is withdrawn. The equiviscous temperature of the sample is measured at 4000 cPxg/cc. Hypothetically, assume the measured equiviscous temperature is 110° C and the desired product should have a softening point (cube-in-air) of 100° C. From the graph of FIG. 3, it can easily be seen that an equiviscous temperature of 110° C is equivalent to a cube-in-air softening point of about 74 and that the equiviscous temperature for a cube-in-air softening point of 100° C at 4000 cPxg/cc is about 133° C. Therefore, from the comparison of the measured equiviscous temperature of 110° C with the predetermined equiviscous temperature of 133° C, the parameters of the distillation can be adjusted. After an additional finite time, an additional sample is taken and the equiviscous temperature determined at 4000 cPxg/cc, compared to the predetermined temperature value of 133° C and the parameters of the reaction adjusted again in response to the comparison.

From the above it can be seen that the apparatus of my invention is based upon the measurement of the equiviscous temperature. The apparatus of my invention may be better understood with reference to FIGS. 4 and 5. FIG. 4 is an illustration of an apparatus of my invention for measuring the equiviscous temperature, the value of which may subsequently be used for controlling the pitch still operation. FIG. 5 illustrates an apparatus of my invention for measuring the equiviscous temperature, comparing it to the predetermined temperature and automatically controlling the pitch still operation from the comparison.

More specifically, with reference to FIG. 4, there is provided a means 1 for removing a sample of pitch from the still through conduit 2 into sample chamber 3. There is also provided a means 4 which operates in cooperation with means 1 to remove the sample from chamber 3 via conduit 5 and return it to the still. Sample chamber 3 has a means 6 for heating and cooling the sample contained therein. Chamber 3 also has located strategically therein a temperature sensing means 7 and a viscosity sensing means 8. The viscosity sensing means 8 is connected to a viscosity read out means 9 (optional) and the temperature sensing means is connected to a temperature read out means 10. The viscosity sensing means and temperature sensing means are also connected with the heating and cooling means 6 which is responsive to signals from the viscosity sensing and temperature sensing means.

More specifically with reference to FIG. 5, there is provided an apparatus for automatically controlling the pitch still operation. There is provided a means for removing a sample of pitch from the still through conduit 2 into sample chamber 3. There is also provided a means 4 which operates in cooperation with means 1 to remove the sample from chamber 3 via conduit 5 and return it to the still. Sample chamber 3 has a means 6 for heating and cooling the sample contained therein. Sample chamber 3 also has located strategically therein a temperature sensing means 7 and a viscosity sensing means 8. The viscosity sensing means and temperature sensing means are connected with computer 19. They send signals to the computer and operate in response to signals from the computer. The computer 19 is connected with the heating and cooling means 6 which operates in response to signals from the computer.

The apparatus for measuring equiviscous temperature described in FIGS. 4 and 5 operate in the following manner. A sample of hot pitch is brought from the reactor through conduit 2 into sample chamber 3. If the sample is sufficiently hot (i.e., more than 60° C above the expected softening point) then the cooler is activated by the temperature sensing means. If the temperature is not sufficiently hot, the heating means is activated and the sample heated until it reaches a temperature of about 60° C higher than the expected softening point. Then the cooling means is activated and cooling begins. The viscosity measuring device continuously measures the viscosity of the pitch as it cools down. When the viscosity of the pitch reaches the preselected value, the equiviscous temperature is measured and recorded. After the equiviscous temperature is measured, the sample is returned to the still through conduit 5. The heater may be activated before the sample is removed in order to heat the sample to a sufficiently high value to make the transfer process easier.

When using the semiautomatic method and apparatus of my invention, the still operator compares the measured equiviscous temperature value with the predetermined equiviscous temperature. The operator then adjusts the parameters of the reaction based on this comparison. When using the automatic apparatus and method, the computer compares the measured equiviscous temperature with the predetermined equiviscous temperature (taken from a plot of equiviscous temperature versus conventional softening point) and adjusts the parameters of the reaction in response to this comparison. If the pitch has not reached the desired conventional softening point, then at a selected time interval after the adjustments are made, another measurement is made. This procedure is repeated until the desired equiviscous temperature and hence softening point is reached.

FIG. 6 is an illustration of a preferred apparatus of my invention. The apparatus employs the known principle of timing the fall of a steel ball in a tube filled with the pitch sample as the viscosity sensing means. The apparatus has a means for measuring the temperature of the pitch as that point when the viscosity reaches a preselected level (equiviscous temperature). The equiviscous temperature is then used to control the production unit.

More specifically with reference to FIG. 6, there is a pump 1 which removes a sample of pitch from the still and brings it to sample chamber 3 through conduit 2. There is also a pump 4 which operates in cooperation with pump 1 to remove the sample of pitch from sample chamber 3 through return conduit 5 and back to the still. Sample chamber 3 has a means 16 for heating the sample therein and a means 17 for cooling the sample therein. A temperature sensing means 18 is located in the sample chamber. A viscosity measuring device is also located within sample chamber 3. The viscosity measuring device is comprised of a steel ball 29, which is located inside a non-conducting tube 20 and which can move freely up and down inside the non-conducting tube. The non-conducting tube is open at both ends but is provided with a means 21 of preventing the ball from falling out. A capacitance device 22 is provided to signal the end of the downward travel of the ball. The tube is located on pivots 23 and connected to a means 24 which turns the tube rapidly through 180° at predetermined intervals.

The apparatus operates as follows. A sample of hot pitch is brought through conduit 2 into sample chamber 3. If the temperature is sufficiently hot, cooling means 17 is activated. If the temperature is not sufficiently hot, heating means 16 is activated until the temperature is sufficiently hot, then the cooling means 17 is activated. The falling ball viscosity measuring device measures the viscosity at preset intervals as the sample is cooling. When the viscosity reaches the preselected value, the equiviscous temperature is measured and recorded. This equiviscous temperature is then compared to the predetermined temperature and the parameters of the reaction adjusted accordingly. If the pitch has not reached the desired softening point, the process is repeated until the softening point is obtained.

The apparatus of my invention has a means for heating and a means for cooling the sample of pitch. The heating means may be of any conventional type. For example, it can be an electric coil, circulating water, circulating steam, or any other of the commonly employed heating devices. The heating means may easily be located outside of the sample chamber. It is within the scope of this invention to use a heating means located outside of the sample chamber. For example, the pitch sample may easily be heated in the conduit which brings the sample to the chamber. The cooling means is somewhat optional and the sample may be allowed to cool by natural convection. However, in order to speed up the process a cooling means should be employed. Examples of some applicable cooling means are forced air, circulating water, circulating refrigerant, or any other of the well known and employed cooling devices.

The apparatus of my invention also has a means for withdrawing a sample of pitch from the still and a means for returning it thereto. These means are generally a series of valves, pipes and pumps. They may also be combined into one means which withdraws the sample and returns it to the still. It is also within the scope of this invention to discard the sample after measuring the equiviscous temperature. The sample may easily be discarded, especially when it is of a small magnitude.

The temperature sensing means of my invention may be of any conventional type. Examples of some useful temperature sensing devices are mercury bulb thermometers, thermocouples and resistance thermometers.

The viscosity sensing means of my invention may be any means which will accurately measure the viscosity of the pitch. Examples of some useful viscosity sensing means are a torsion rheometer, falling ball viscometer, and vibrating probe viscometer.

What is claimed is:

1. An apparatus for controlling the operation of a pitch still reactor comprising a means for removing a sample of pitch from the pitch still reactor, a sample chamber for holding a sample of the pitch, a means for heating the sample, a temperature sensing means and viscosity sensing means located within the chamber that cooperate to measure the temperature when the viscosity it at a preselected value and means for comparing the measured temperature with a predetermined value and controlling the parameters of the reaction in response to the comparison.

2. An apparatus as in claim 1 which further includes a means for returning the sample of pitch to the reactor.

3. An apparatus as in claim 2 which further includes a means for cooling the sample in the sample chamber.

4. An apparatus as in claim 1 which further includes a means for cooling the sample in the sample chamber.

* * * * *